US011238358B2

(12) United States Patent
Yuan et al.

(10) Patent No.: US 11,238,358 B2
(45) Date of Patent: Feb. 1, 2022

(54) PREDICTING SITE VISIT BASED ON INTERVENTION

(71) Applicant: Microsoft Technology Licensing, LLC, Redmond, WA (US)

(72) Inventors: Yiping Yuan, Sunnyvale, CA (US); Lingjie Weng, Sunnyvale, CA (US); Rupesh Gupta, Sunnyvale, CA (US); Shaunak Chatterjee, Sunnyvale, CA (US); Romer E. Rosales-Delmoral, Burlingame, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 934 days.

(21) Appl. No.: 15/884,527

(22) Filed: Jan. 31, 2018

(65) Prior Publication Data
US 2019/0188594 A1 Jun. 20, 2019

Related U.S. Application Data

(60) Provisional application No. 62/607,012, filed on Dec. 18, 2017.

(51) Int. Cl.
*G06N 7/00* (2006.01)
*G06N 20/00* (2019.01)
*G06F 3/0483* (2013.01)
*H04L 29/08* (2006.01)

(52) U.S. Cl.
CPC ............. *G06N 7/005* (2013.01); *G06N 20/00* (2019.01); *G06F 3/0483* (2013.01); *H04L 67/02* (2013.01); *H04L 67/26* (2013.01)

(58) Field of Classification Search
CPC ........ G06N 7/005; G06N 20/00; G06N 5/022; G06F 3/0483; H04L 67/02; H04L 67/26
See application file for complete search history.

(56) References Cited

U.S. PATENT DOCUMENTS 9,805,391 B2 * 10/2017 Agarwal ............ G06Q 30/0242
2012/0066087 A1 * 3/2012 Zhang ................ G06Q 30/0631
705/26.7
2014/0164385 A1 * 6/2014 Liu ........................ G06F 16/35
707/740

(Continued)

OTHER PUBLICATIONS

Ji et al, "A Probabilistic Multi-Touch Attribution Model for Online Advertising", Oct. 2016, ACM , https://dl.acm.org/doi/10.1145/2983323.2983787#d1246212e1 (Year: 2016).*

(Continued)

*Primary Examiner* — Alan Chen
(74) *Attorney, Agent, or Firm* — Schwegman Lundberg & Woessner, P.A.

(57) ABSTRACT

A method can include determining a first probability that a first member of members of a website will visit the website within a specified time window if the first member is provided an intervention at a specified time, determining a second probability that the first member will visit the website within the specified time window without being provided the intervention, determining a difference between the first and second probability, and in response to determining the difference is greater than a first specified threshold, providing the intervention at the specified time.

17 Claims, 8 Drawing Sheets

(56) References Cited

U.S. PATENT DOCUMENTS

2016/0267520 A1\* 9/2016 Kalish ................ G06Q 30/0272
2018/0081978 A1\* 3/2018 Lv ....................... G06F 16/9535
2019/0066149 A1\* 2/2019 Strong ............... G06Q 30/0242

OTHER PUBLICATIONS

Lisa Orr, "Predicting Mobile App User Churn: Training & Scaling Our Machine Learning Model", Apr. 14, 2017, insidebigdata, https://insidebigdata.com/2017/04/14/predicting-mobile-app-user-churn-training-scaling-machine-learning-model/ (Year: 2017).\*

\* cited by examiner

PREDICTING SITE VISIT BASED ON INTERVENTION

CROSS-REFERENCE TO RELATED APPLICATION

This application claims the benefit of priority to U.S. Provisional Application Ser. No. 62/607,012, filed Dec. 18, 2017, which is incorporated by reference herein in its entirety.

TECHNICAL FIELD

The present application relates generally to predicting whether a user will visit a website, such as through an app, within a given time period from a specified time with and without an intervention.

BACKGROUND

Every month, members of a social network churn. Churning can include a member reducing their activity on the social network or leaving the social network. Member engagement and retention is a challenge faced by all social networking and other networking websites. Member engagement forms the backbone of the networking websites, since without member engagement there is no network. There are many techniques to attempt to retain user attention or increase user engagement.

BRIEF DESCRIPTION OF THE DRAWINGS

Some embodiments of the present disclosure are illustrated, by way of example and not limitation, in the accompanying drawings, in which like reference numbers indicate similar elements.

DETAILED DESCRIPTION

Figure 1:
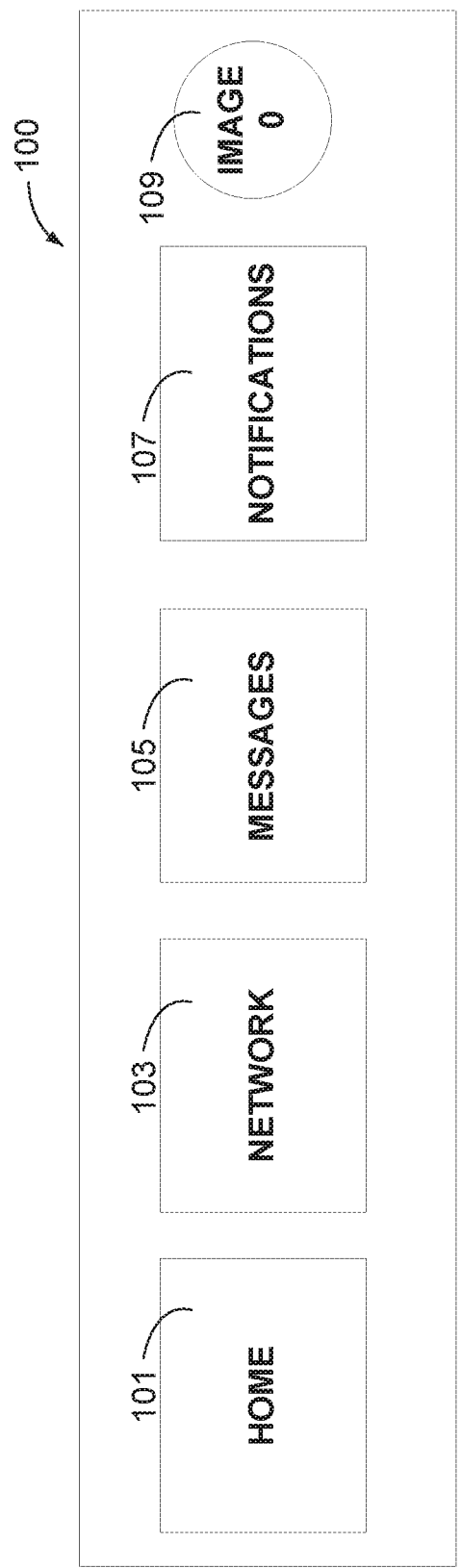
FIG. 1 illustrates, by way of example, a block diagram of an embodiment of a portion of a user interface of a device.

The present disclosure describes embodiments of systems methods, systems, apparatuses, and non-transitory machine-readable mediums for predicting if a user will visit a website within a specified time period.

Users' attention is possibly the most valuable commodity for all social networks and other websites. Gaining and retaining user attention forms a basis for growth in terms of both engagement and revenue. From desktop websites, to mobile apps, to push notifications, social networks have devised more invasive ways to seek a user's attention. Retaining this attention, however, depends on providing value to the users without annoying the user.

Embodiments provide a probability of a visit (pVisit), that predicts a user's probability of visiting a website, such as through a desktop version of the site directly or a mobile app. Each visit results in a session. Embodiments can determine how an intervention (e.g., notification, electronic mail (email), member-to-member (M2M) communication (e.g., people you may know (PYMK), private message, etc.), or the like) will affect a user's interactions with the site/app or a user's expected time to visit the site. A goal can include finding a strategy to distribute interventions to users, given a budget, and to boost users' engagement, such as over a specified period of time.

An objective for communication relevance is to boost user's engagement and improve users' overall experience with the site with interventions. A pVisit engine receives intervention candidates, and decides to whom to send, when to send, and how to send an intervention, if an intervention is sent at all.

In terms of relevance, click models (to predict the click-through rate) have been the center of response modelling. However, there are drawbacks to making decisions based on pclick (the probability of a click-through given the notification is impressed/viewed). First, pclick models are not time sensitive, as in most cases, the underlying probability of clicking, given an impression, does not depend on when the intervention is sent. Therefore, pclick models are not very helpful to determine when to send an intervention. Second, the predicted pclick value is a good measure of the quality of the intervention, but not a good measure of the effectiveness of the intervention. An assumption that higher pclick notifications are more effective may not be correct. For example, consider two in-app interventions, one with pclick of 0.9 for user A, a very active user, and one with pclick of 0.4 for user B, a less active user. Although the in-app intervention has a higher probability of interaction, user A is also more likely to visit the website even if the intervention is not sent. If the second in-app intervention is not sent, user B may not visit the website. So, it is possible that an intervention with pclick of 0.4 is more effective in boosting sessions than an intervention with a higher pclick. Further, pclick models cannot answer how many notifications to send to a user each day. If a user has 10 high-quality interventions with high pclick scores today, are all of them going to be sent today? If the user only has a few low-quality interventions with low pclick scores, are no interventions going to be sent to the user? The answers are unclear with pclick models.

These challenges provide a strong call for more relevant models to assist the decision making. The pVisit models described can add a useful technical solution the technical problem of such decision-making.

With notifications, mobile apps can buzz and badge users to get their attention. There is a different paradigm between the websites and the app, since an app can reach out to a user proactively, such as by using a badge notification or a buzz. At this high-stakes game, the cost of a mistake is also much higher. Notifications can be turned off because of a poor notification, and even worse an app could be deleted. Turning off notifications can be more likely than deleting the app (or un-bookmarking a website), because of a poor recommendation. Another possible outcome of a low-quality notification can include making the user "notification-blind". At the same time, good notifications can provide timely value to a user, and increase the short or long-term engagement of the user on the website.

Consider a problem of determining whether to provide an intervention to a user. An intervention may increase user engagement, such as by notifying a user that there is content to be consumed using an app. However, a user can view an intervention as annoying, such as if the content related to the intervention is not of sufficient interest to the user, or if the intervention itself annoys the user. A user can become blind to an intervention if the intervention is displayed too many times, or the content related to the intervention is not of sufficient interest to the user. In worse situations, a user can either turn off notifications, or delete the app, such as in response to too many interventions or a bad intervention.

Member conversion is a strategy of growing a member population of a website. Each month, millions of members of a social networking platform hosted by LinkedIn Corporation of Mountain View, Calif., U.S.A., and other social networks churn and lose engagement. Initiatives to improve resurrection and member retention can help in growing a member population.

A specific type of intervention is PYMK. Compared to other intervention types, people you may know (PYMK) interventions have at least two advantages: 1. Email/notification triggered by PYMK invitation has been proved as one of the most efficient channels of resurrecting dormant members. Receiving an invitation is an interesting notification to most members. Downstream actions, like accept invitation or profile view help engage the user receiving the PYMK notification. 2. Many dormant users are starving for relevant notifications. Unlike other non-triggered notifications, by showing a dormant member or other member a PYMK, a new relevant notification can be provided.

Member to Member (M2M) invitations sent to dormant members can have significant impact on their resurrection. M2M invitations sent to retained members can increase the monthly active members. Monthly active members can be as important as dormant members for increasing total member activity. A PYMK invitation sent to monthly active members can provide more contribution to member retention or engagement than that invitation sent to dormant members.

Embodiments consider a customized strategy (e.g., per user or per population segment of users with similar or same profile data) to effectively use PYMK invitations, and other interventions, as a channel to trigger more member invitation notifications for dormant or less active members, thus to bring them back to the site or to increase their overall member activity. To effectively target a resurrectable or retainable member via PYMK invites, a propensity to visit (pVisit) model can be trained to predict a probability of visiting a website (e.g., a profile page of a PYMK invite recipient). By encouraging more exposure of target members on other people's PYMK, the target members can get more invitation notifications and more potential visits, and thus remain interested in the website or increase their activity on the website.

Embodiments can provide one or more technical solutions to the technical problem of determining whether to provide a user with an intervention, when to send the intervention, or what type of intervention to send. The technical solution can include determining a first probability that a user will visit a website if an intervention is provided, a second probability that a user will visit the website without an intervention, and determining if a difference between the first and second probabilities is greater than (or equal to) a specified threshold. The technical solution can include using an accelerated failure model constrained by a Weibull distribution to make such determinations. The accelerated failure time model can be trained based on historical session counts of the user, count of notifications received, whether the user has an app installed and notifications enabled, or a last visit date. Other details regarding technical solutions are provided elsewhere herein.

FIG. 1 illustrates, by way of example, a block diagram of an embodiment of a portion of a user interface 100 of a device. The user interface 100 as illustrated includes a plurality of selectable software controls including a home control 101, a network control 103, a messages control 105, a notifications control 107, and a settings control 109. The user interface 100 can be of a portion of a home page of a user of a social network site. In one or more embodiments, a social networking site can include a social networking app, such as can include Facebook, from Facebook, Inc. of Menlo Park, Calif., U.S.A., Google Plus, from Google, Inc. of Mountain View, Calif., LinkedIn, from LinkedIn Corporation of Sunnyvale, Calif., U.S.A., Instagram, from Facebook, Inc. of Menlo Park, Calif., among others. In one or more embodiments, the user interface 100 can be of a portion of a website that is not a social networking website.

The home control 101, in response to being selected by a user, can cause a newsfeed to be presented to the user. The newsfeed can include posts made by members connected to the user, posts liked or commented on by members connected to the user, advertisements, interventions, or the like.

The network control 103, in response to being selected by a user, can cause details regarding connections previously made, pending connections, or other members the user may know (see FIG. 2) to be presented to the user. The messages control 105, in response to being selected by a user, can cause details of electronic messages sent by or sent to the user to be presented to the user.

The notifications control 107, in response to being selected by a user, can cause details regarding activities of potential interest to the user to be presented to the user. The activities of potential interest to the user can include an anniversary (e.g., work anniversary), a birthday, posts or activities of other members, or the like.

The notifications control 107 indicates to a user that there is some subject matter or content to attend to through a website. The notification control 107 can be displayed to get a user's attention and elicit a response from the user. The notifications control 107 can indicate a variety of different things. For example, a notification can indicate that a user has a new message, a user they have followed on a social networking site has made a post, another user has commented or liked a post or followed the user on a social networking site, the app has an update available, updated maps are available for a map app, money has been transferred to/from the user's financial account, a notable news event has occurred, a user has confirmed they know the user, or the like. The notifications control 107 is controlled by the website. The notifications control 107 can be associated with content of varying degrees of importance or interest to a user.

Consider a situation in which the notifications control 107 regards content that irritates the user. The user can act on the notifications control 107, such as by selecting the notifications control 107 and viewing the content associated with the notifications control 107. The user can be irritated by the content associated with the notifications control 107 and can disregard future occurrences of the notifications presented by the notifications control 107.

Consider another situation in which the notifications control 107 indicates there is content that requires the user's attention nearly every time the user visits the website. The notifications control 107 can gain less of the user's attention than if the notifications control 107 were presented less often.

Either of the situations presented can result in a user disabling notifications, visiting the website less often, or even worse, deleting the app associated with the notifications control 107. Embodiments provide predictive tools to determine how a user will respond to an intervention, such as a notification provided through the notifications control 107.

The settings control 109, in response to being selected by a user, can cause details of user options regarding privacy, security, newsfeed content population, or the like to be presented to the user. Through user interactions with the settings control 109, the user can alter how a newsfeed is populated with content, interventions that are provided, who may view the user's home page, or the like.

Figure 2:
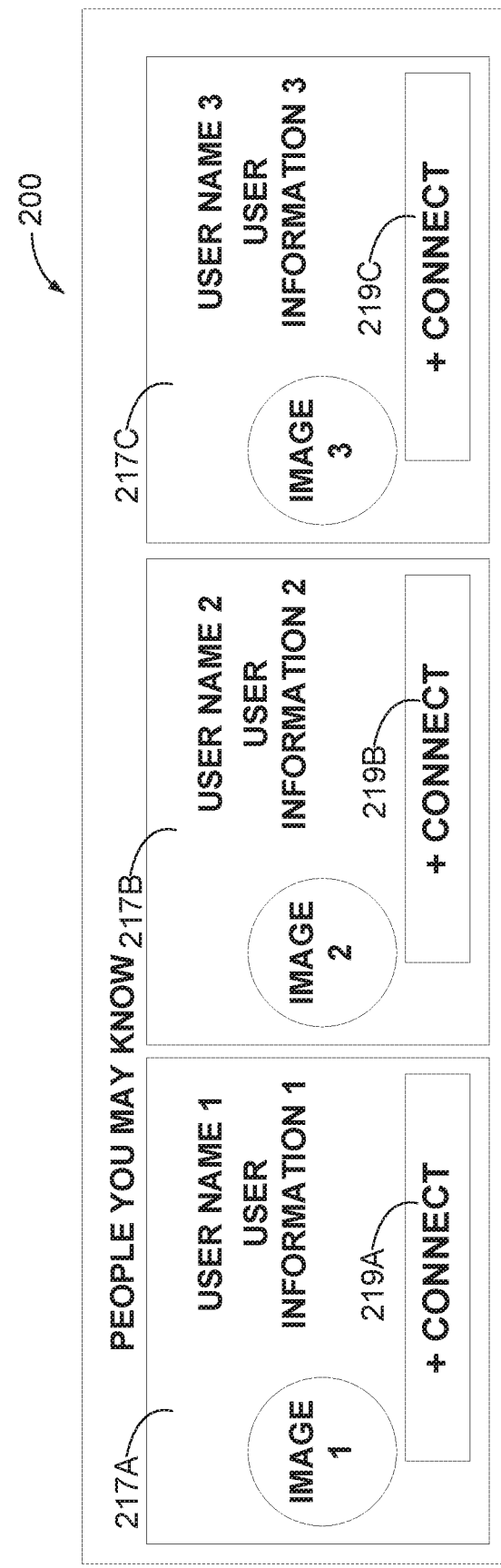
FIG. 2 illustrates, by way of example, a diagram of an embodiment of a portion of a user interface that presents other members with which the user may be interested in connecting.

FIG. 2 illustrates, by way of example, a diagram of an embodiment of a portion of a user interface 200 that presents other members with which the user may be interested in connecting. The user interface 200, as illustrated includes, for each person presented on the user interface 200, information summarizing a member 217A, 217B, and 217C, respectively, and a connect control 219A, 219B, and 219C, respectively. The information summarizing the member 217A-217C can include a name of the member, member current or past job, a connection in common with the user, a profile picture of the member, or the like. The connect control 219A-219C, in response to being selected by the user, causes a connection request message to be sent to the member associated with the respective information regarding the member 217A-217C.

Various embodiments described herein include encoded instructions that comprise operations to determine a probability or decide whether to provide an intervention, a time to provide an intervention, a type of intervention to provide, or the like. The intervention can be displayed to be representative of one or more content items on a website that the user can find of interest. The intervention can be selected by a pVisit engine 206 (see FIG. 3, among others), such as for display on a computing device, a server computing device, a mobile computing device, etc.

It is understood that a machine learning data model is represented according to one more encoded instructions that, when executed, perform calculations that result in inferences, predictions, conclusions, or estimations based in part on training data. In one example, the machine learning data model can include data mining historical member data to determine a propensity for the member to respond to an intervention by visiting a website, such as based on an accelerated failure time model.

Figure 3:
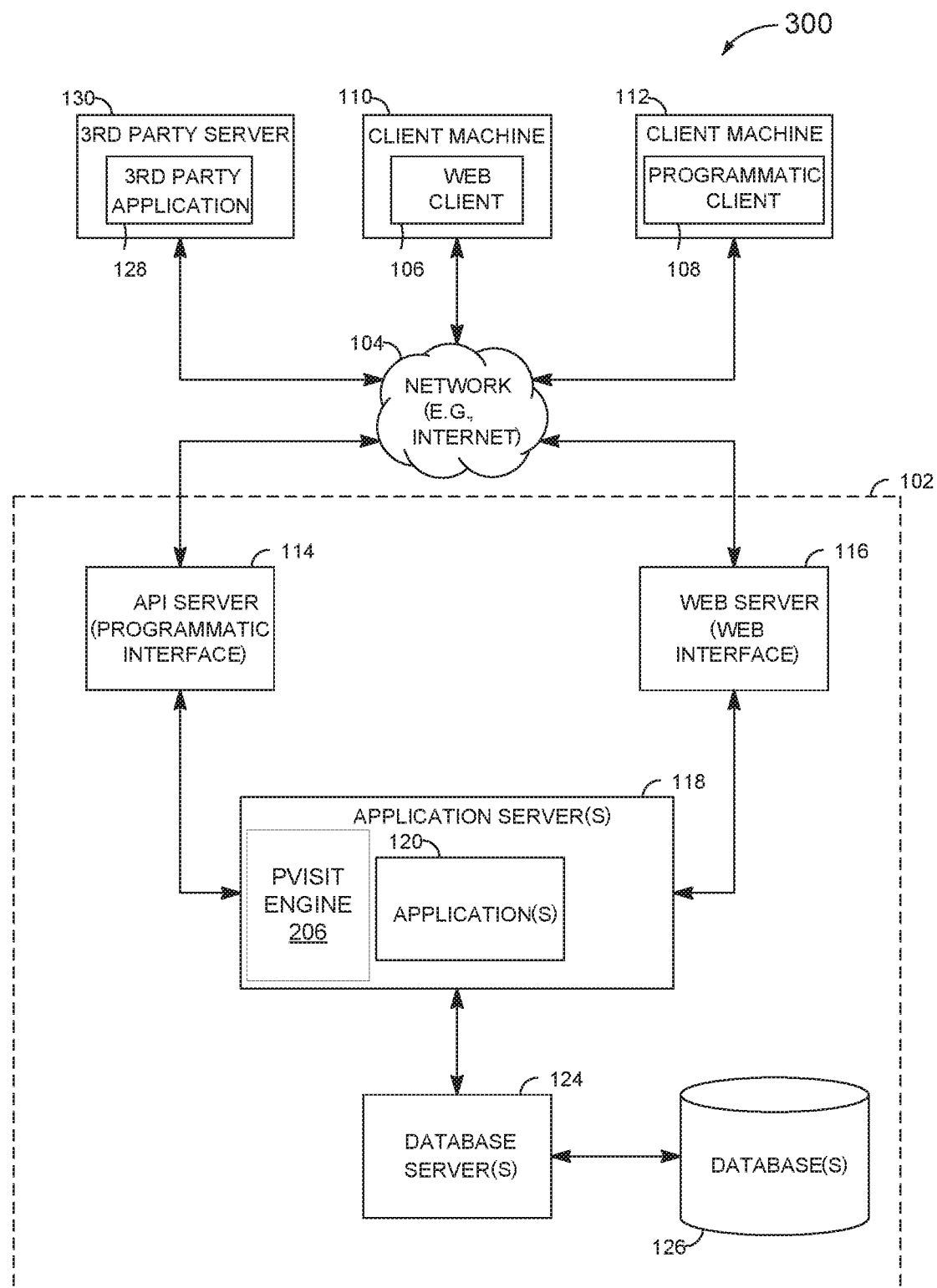
FIG. 3 illustrates, by way of example, a block diagram of an embodiment of a client-server system.

FIG. 3 illustrates, by way of example, a block diagram of an embodiment of a client-server system 300. A networked system 102 provides server-side functionality via a network 104 (e.g., the Internet or Wide Area Network (WAN)) to one or more clients. FIG. 3 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 3 to form part of the networked system 102, in alternative embodiments, the applications 120 may form part of a service that is separate and distinct from the networked system 102.

Further, while the system 300 shown in FIG. 3 employs a client-server architecture, the present disclosure is not limited to such an architecture, and could be used in a distributed, or peer-to-peer, architecture system, for example. The various applications 120 could also be implemented as standalone software programs, which do not necessarily have networking capabilities.

The web client 106 accesses the various applications 120 via a web interface supported by the web server 116. Similarly, the programmatic client 108 accesses the various services and functions provided by the applications 120 via the programmatic interface provided by the API server 114.

FIG. 3 also illustrates a third-party application 128, executing on a third-party server 130. The third-party server machine may have programmatic access to the networked system 102 via the programmatic interface provided by the API server 114. For example, the third-party application 128 may, using information retrieved from the networked system 102, support one or more features or functions on a website hosted by the third party. The third-party website may, for example, provide one or more functions that are supported by the relevant applications of the networked system 102. In some embodiments, the networked system 102 may comprise functional components of a professional social network.

The application servers 118, as illustrated, host pVisit engine 206. The pVisit engine 206 determines whether to present an intervention to a user, when to present an intervention to a user, or which type of intervention(s) to present to a user. The pVisit engine 206 can consider whether presenting the intervention will reduce a probability the user will spend less time using a website (or increase a probability the user will spend more time using the website). In making the determination of whether to present the intervention, the pVisit engine 206 can consider a relevance, to the user, of content associated with the intervention, a history of the user's interactions with content, a history of the user's interactions with other users, or the like. The pVisit engine 206 can consider a history of other user's reactions to the intervention in determining whether to provide the intervention. The other users can include other users with one or more similar attributes (discussed elsewhere herein). The pVisit engine 206 can implement an accelerated failure time model, such as can be constrained by a Weibull distribution, or the like, in determining whether to provide the intervention. Further details of operation of the pVisit engine 206 are provided elsewhere herein.

Figure 4:
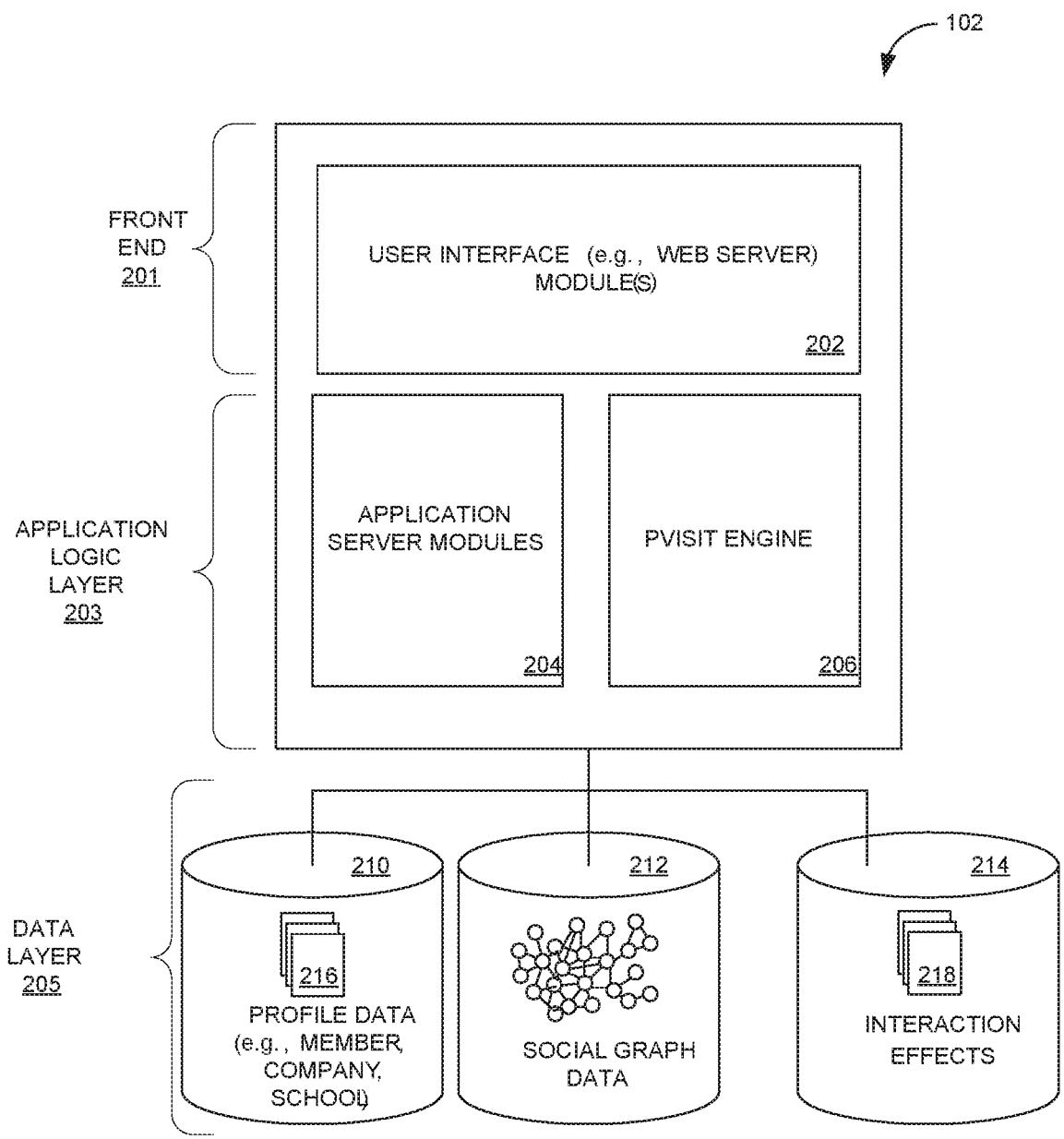
FIG. 4 illustrates, by way of example, a block diagram of an embodiment of functional components of a professional social network within the client-server system.

FIG. 4 illustrates, by way of example, a block diagram of an embodiment of functional components of a professional social network within the client-server system. As shown in FIG. 4, the professional social network may include a three-tiered architecture, consisting of a front-end layer 201, an application logic layer 203, and a data layer 205. In some embodiments, the modules, systems, and/or engines shown in FIG. 4 represent a set of executable software instructions and the corresponding hardware (e.g., memory and processing circuitry (e.g., a processor, field programmable gate array (FPGA), and/or components configured to execute instructions and perform operations dictated by the instructions, such as can include a transistor, resistor, inductor, capacitor, regulator, power source, multiplexer, amplifier, switch, buffer, diode, or the like)) for executing the instructions. One skilled in the art recognizes that various additional functional modules or engines may be used with a professional social network, such as that illustrated in FIG. 4, to facilitate additional functionality that is not specifically described herein. The various functional modules and engines depicted in FIG. 4 may reside on a single server computer, or may be distributed across several server computers in various arrangements. Moreover, although a professional social network is depicted in FIG. 4 as a three-tiered architecture, embodiments are not limited to such architecture. Other architectures are within the scope of the present disclosure.

As shown in FIG. 4, in some embodiments, the front-end layer 201 comprises a user interface module (e.g., a web server) 202, which receives requests and inputs from various client-computing devices (e.g., client machine 110 or 112, or $3^{rd}$ party server 130), and communicates appropriate responses to the requesting client devices. For example, the user interface module(s) 202 may receive requests in the form of Hypertext Transport Protocol (HTTP) requests, or other web-based, application programming interface (API) requests.

In some embodiments, the application logic layer 203 includes various application server modules 204, which, in conjunction with the user interface module(s) 202, generates various user interfaces (e.g., web pages) with data retrieved from various data sources in the data layer 205. In some embodiments, individual application server modules 204 are used to implement the functionality associated with various services and features of the professional social network. For instance, the ability of an organization to establish a presence in a social graph of the social network service, including the ability to establish a customized web page on behalf of an organization, or to publish messages or status updates on behalf of an organization may be services implemented in independent application server modules 204. Similarly, a variety of other applications or services that are made available to members of the social network service may be embodied in their own application server modules 204.

As shown in FIG. 4, the data layer 205 may include several databases, such as a database 210 for storing profile data 216, including both member profile attribute data as well as profile attribute data for various organizations. In some embodiments, when a person initially registers to become a member of the professional social network, the person is prompted to provide some profile attribute data, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information may be stored, for example, in the database 210. Similarly, when a representative of an organization initially registers the organization with the professional social network, the representative may be prompted to provide certain information about the organization. This information may be stored, for example, in the database 210, or another database (not shown). In some embodiments, the profile data 216 may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or a seniority level within a company. In some embodiments, importing or otherwise accessing data from one or more externally hosted data sources may enhance profile data 216 for both members and organizations. For instance, with companies, financial data may be imported from one or more external data sources, and made part of a company's profile.

The profile data 216 may also include information regarding settings for members of the professional social network. These settings may comprise various categories, including, but not limited to, privacy and communications. Each category may have its own set of settings that a member may control.

After a user is registered, a member may invite other members, or be invited by other members, to connect via the professional social network. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. The various associations and relationships that the members establish with other members, or with other entities and objects, may be stored and maintained as social graph data within a social graph database 212.

The professional social network may provide a broad range of other applications and services that allow members the opportunity to share and receive information with each other, often customized to the interests of the member. For example, with some embodiments, the professional social network may include a photo sharing application that allows members to upload and share photos with other members. With some embodiments, members may be able to self-organize into groups, or interest groups, organized around a subject matter or topic of interest. With some embodiments, the professional social network may host various job listings providing details of job openings with various organizations.

In some embodiments, the professional social network provides an application programming interface (API) module through which third-party applications can access various services and data provided by the professional social network. For example, using an API, a third-party application may provide a user interface and logic that enables an authorized representative of an organization to publish messages from a third-party application to a content hosting platform of the professional social network that facilitates presentation of activity or content streams maintained and presented by the professional social network. Such third-party applications may be browser-based applications, or may be operating system-specific. Some third-party applications may reside and execute on one or more mobile devices (e.g., a smartphone, or tablet computing devices) having a mobile operating system, such as the client machine 110 or 112.

The data in the data layer 205 may be accessed, used, and adjusted by the pVisit engine 206 as described elsewhere herein. Although the pVisit engine 206 is referred to herein as being used in the context of a professional social network, it is contemplated that it may also be employed in the context of any website or online services, including, but not limited to, content sharing sites (e.g., photo- or video-sharing sites, text-sharing sites, financial management sites, retail sites, or the like) and any other apps that try to gain and retain a user's attention. Although features of the present disclosure are referred to herein as being used or presented in the context of an app, it is contemplated that any user interface view (e.g., a user interface on a mobile device or on desktop) is within the scope of the present disclosure.

In one or more embodiments, the data layer 205 further includes a database 214 that includes interaction effects data 218 based on social network activity of one or more member accounts. The interaction effects data 218 can include data indicating cause and effect. For example, an effect can include a user turning off notifications, deleting the app, increasing daily activity on the site, or the like. For example, a cause can include providing a user X number of badge notifications in the short-term, providing Y number of badge notifications in the long-term, providing a specific intervention, or a combination thereof.

The pVisit engine 206 can identify past actions of users with similar profiles. For example, consider a user with five years experience as a software engineer, age 30-35, a college education, and determined to be actively looking for a job. The parameters of the model implemented using the pVisit engine 206 for the software engineer can be determined based on other users with three to five years of experience as a software or computer engineer, aged 30-35, and actively looking for a job. These users can be determined by mining the profile data 216.

The interaction effects data 218 can include data of past behaviours performed by a user or data regarding circumstances surrounding the past behaviours. For example, the interaction effects data 218 can include data indicating that the user has, visited the website a specified amount of time after viewing or selecting an intervention, disabled notifications, or deleted the app. The circumstances surrounding this behaviour can include data regarding a number of short and long-term interventions, a user activity level, or the like. This data can be mined and aggregated to determine the parameters of a pVisit model constructed by the pVisit engine 206.

Consider the software engineer previously discussed. The pVisit model representing the software engineer's response to the intervention can be determined based on the pVisit (probability of a visit), such as can be trained on interaction effects data 218 of similar software engineers. For example, if data indicates that an intervention, when provided two or three times a day, maximizes retention gain or interaction from software engineers and has low probability of adverse effects (e.g., disabling notifications or deleting the app), the pVisit model can infer this from the data and indicate that it is as good strategy to send the intervention (same or different intervention) to the software engineer two to three times a day.

Figure 5:
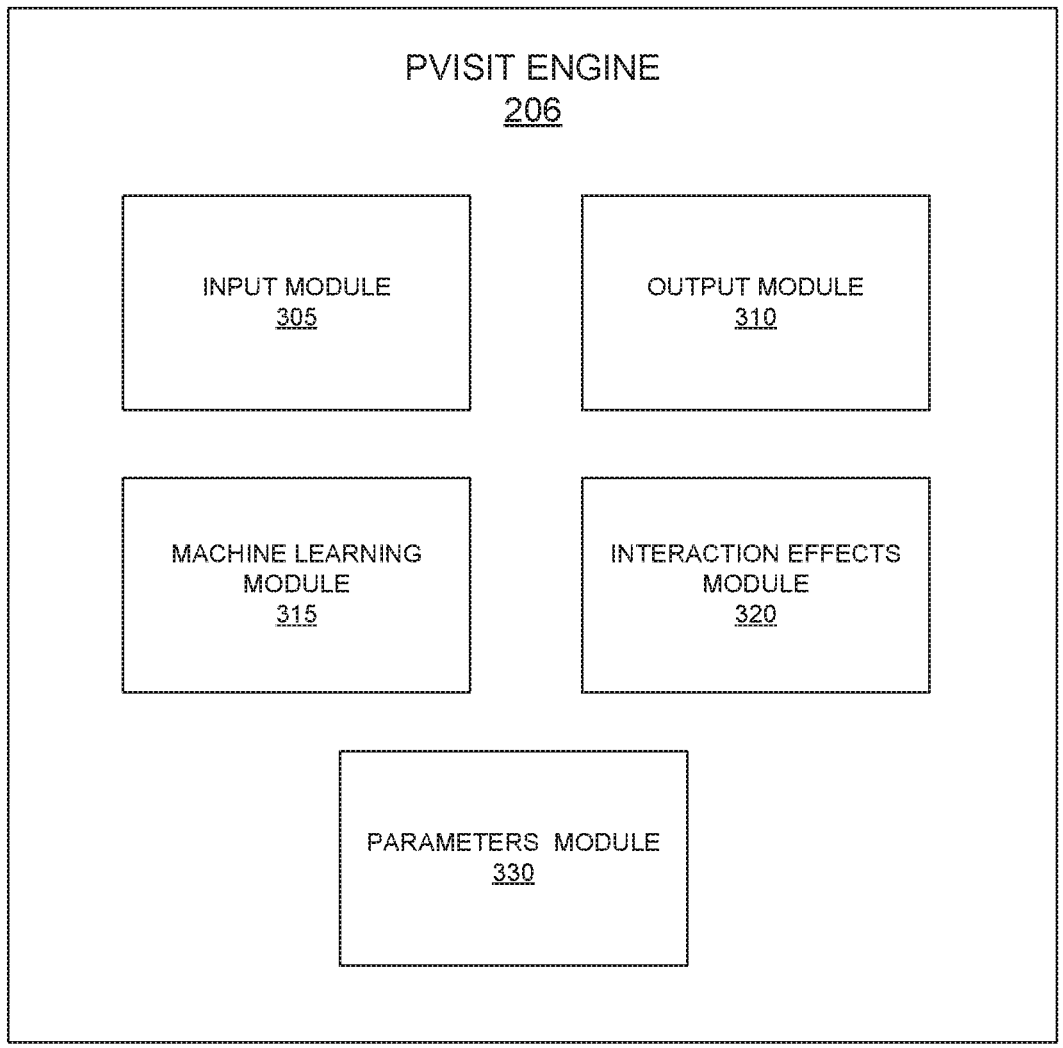
FIG. 5 illustrates, by way of example, a block diagram of an embodiment of components of a pVisit engine.

FIG. 5 illustrates, by way of example, a block diagram of an embodiment of components of the pVisit engine 206. The input module 305 is a hardware-implemented module that controls, manages and stores information related to any inputs from one or more components of system 102 as illustrated in FIG. 3 and FIG. 4. In various embodiments, the inputs include a plurality of content items, a target member account, training data, one or more historical interaction effects, or the like. The training data can include historical session counts, counts of interventions received in one or more specified time periods, whether the member has an app installed and/or push notifications enabled, notification email CTR, a last date the member visited the website, a time it took for the member to visit the website after receiving the intervention, or the like.

The output module 310 is a hardware-implemented module that controls, manages and stores information related to sending output data to one or more components of system 300 of FIG. 3 (e.g., one or more client machines 110, 112, third party server 130, etc.). In some embodiments, the output is a probability of an adverse effect or a probability of gaining or retaining a user's attention using an intervention. In some embodiments, the output is a list of possible interventions and a corresponding probability that indicates (a) a difference in a probability that a user will visit the website in a given time period with an intervention and a probability that the user will visit the website in the given time period without an intervention, and (b) a corresponding intervention associated with the probability. Such a list accounts for embodiments that can include multiple different interventions and that users can respond differently to different interventions.

The machine learning module 315 is a hardware implemented module which manages, controls, stores, and accesses information related to building, training, updating and executing a machine learning data model, such as parameters for the pVisit model. In some embodiments, a target member account can be input into the machine learning data model. The machine learning data model may return parameters to be used in the pVisit model. The machine learning module 315 can implement an accelerated failure time technique, such as can be constrained by a Weibull distribution, in determining the parameters, discussed in more detail below. The machine learning data model can be built and refined according to training data, which may be based on historical social network activity data, historical member account data, or profile data of one or more member accounts.

The interaction effects module 320 is a hardware-implemented module which manages, controls, stores, and accesses information related to collecting interaction effects for a set of interaction effects. In some embodiments, the interaction effects module 320 collects member account behavior (such as number of website interactions, disabling or enabling notifications, number of badge notifications presented to the user long-term, number of interventions presented to the user short-term, or the like). The interaction effects module 320 populates the interaction effects database 214.

The parameters module 330 is a hardware-implemented module which manages, controls, stores, and accesses information related to calculating probabilities, such as conditional, joint, or other probabilities of the pVisit model. A conditional probability indicates a likelihood that a second event occurs given that a first event has occurred. A joint probability indicates a likelihood of two or more events occurring. Example probability calculations performed by the parameters module 330 can include one or more of: (1) a likelihood of gaining a user's attention (e.g., a website access) without intervention given one or more of a user's job seeking status, professional experience, previous number of interventions provided to the user over the short-term or long-term, age, activity level on the website (number of website accesses in a specified period of time), job title, gender, intrinsic interest in the website, affinity for being influenced into visiting the website, or the like; or (2) a likelihood of gaining a user's attention (e.g., a user disabling notifications or deleting an app) with intervention given one or more of a user's job seeking status, professional experience, previous number of interventions provided to the user over the short-term or long-term, age, activity level on the website (number of website accesses in a specified period of time), job title, gender, intrinsic interest in the website, affinity for being influenced into visiting the website, or the like.

Some mathematical details regarding an embodiment of the pVisit model are provided. The mathematical framework discussed may be implemented using one or more of the modules of the pVisit engine 206, such as the machine learning module 315 or the parameters module 330.

Consider the following notations. A visit can be marked by a session in the training data. Let m be a general intervention event and $m_j$ be an intervention event of type j, in embodiments considering more than one type of intervention. Let $T_i$ be a time between an intervention and a website visit for user i. Let w be a time window (e.g., one, two, three, four, or more hours, or one day, two days, or more days). Let $z_i$ be the features of user i, which may be time dependent. Let $y_i$ be a binary digit indicating whether an intervention will be sent to user i. Let $y_{i,j}$ be a binary digit indicating whether an intervention of type $m_j$ will be sent to user i. Let $F_i(t)=Pr(T_i \leq t|z_i,m)$ be the probability that a user i visits the website before time t after a notification event. Let $f_i(t)=dF_i(t)/dt$, be the probability density function of visiting. Let $S(t)=Pr(T_i>t|z_i,m)$ be the probability that a user does not visit from time 0 to time t.

To boost weekly active users through a single type of intervention, two probabilities can be considered. A first probability can include $Pr(T_i \leq w|z_i,m)$, the probability of a user i visiting the website in the next w time window given an intervention sent right now. A second probability can include $Pr(T_i \leq w|z_i, \text{not } m)$, the probability of a user i visiting the website in the next w time window without an intervention. The greater the difference between the first probability and the second probability, the greater the motivation to issue an intervention. Note that w can be chosen based on the case. For example, w can be set 7 if it is desired to boost weekly active users or 1 if it is desired to boost daily active users.

In embodiments in which there is an option between multiple types of interventions, the first probability can include $Pr(T_i \leq w|z_i, mj)$, the probability of a user i visiting the website in the next w time window given a specific intervention of intervention type j sent. A second probability can include $Pr(T_i \leq w|z_i, \text{not } m_j)$, the probability of a user i visiting the website in a next w time window without an intervention. A probability of intervention influence can be defined as $\Delta Pr(T_i \leq w|z_i, mj)=Pr(T_i \leq w|z_i, m_j)-Pr(T_i \leq w|z_i, \text{not } m_j)$.

An example use case includes determining an electronic mail transmission volume to help increase user activity or retention. The following equation can be solved to determine an amount of electronic mail to be transmitted to help maximize website visits.

$$\max(\text{expected unique visits in next } t \text{ days}) = \sum_i^n [Pr(T \leq t | z_i, m) + (1 - y_i)Pr(T \leq t | z_i, \text{not } m)] \quad \text{Eq. 1}$$

$$\text{such that } \sum_i^n y_i \leq C.$$

Equivalently, there exists a cutoff value α for each C such that Equation 2 is an optimal solution.

$$\text{if } Pr(T_i \leq t|z_i,m) - Pr(T_i \leq t|z_i, \text{not } m) - \alpha \geq 0, \text{ then } y_i = 1. \quad \text{Eq. 2}$$

If it is desired to boost weekly active users, then t=7. If it is desired to boost daily active users, then t=1.

Instead of choosing a for a batch budget C, a threshold β can be chosen, such that when $$Pr(T_i \leq t|M) - Pr(T_i \leq t|\text{not } M) \geq \beta$$

an intervention is provided to the user i.

For other types of interventions, such as notifications, different types of notifications can be sent to a user. If a user can respond differently to different types of notifications, then the notification type can be considered in the training of the pVisit model. Equation 3 (Eq. 3) regards a formula for determining an intervention probability in an embodiment in which multiple types of interventions are possible.

$$\max \sum_i^n \sum_j [y_{i,j} Pr(T \leq t | z_i, M_j) + (1 - y_{i,j}) Pr(T \leq t | z_i, \text{not } M_j)] \quad \text{Eq. 3}$$

$$\text{such that } \sum_i^n \sum_j y_{i,j} \leq C \,\&\, \sum_j y_{i,j} \leq 1, \forall\, i.$$

Equivalently, there exists a cutoff value α for each C such that Eq. 4 is an optimal solution.

$$\text{if } Pr(T_i \leq t | z_{i,j*}, M_{j*}) - Pr(T_i \leq t | z_{i,j*}, \text{not } M_{j*}) - \alpha \geq 0, \quad \text{Eq. 4}$$

$$\text{then } y_{i,j*} = 1, y_{i,j} = 0, \text{ if } j \neq j^*, \text{ where}$$

$$j^* = \underset{j}{\text{argmax}} [Pr(t \leq t | z_i, M_j) - Pr(T \leq t | z_i, \text{not } M_j)].$$

If a member is engaged, preventing the member from becoming dormant can be desired. This can be achieved by sending one or more interventions to an active member whose pVisit score (e.g., difference between the first probability and the second probability) falls below a specified threshold. A frequency control method can help to appropriately time these messages. Intuitively, an increasing number of messages can be sent until the pVisit score rises above a certain threshold. Since the member was engaged, these messages should not result in a negative outcome.

If a member is not engaged (e.g., is dormant or their activity level is below a threshold level), getting the member to an active status can be desired. This can be accomplished by sending one or more interventions to a member whose pVisit score is below a certain threshold. A frequency control method can be used to appropriately time these messages. In such an embodiment, a limited number of interventions can be provided to the user until the pVisit score goes above a certain threshold. Since the member was not engaged, these messages could result in various negative outcomes such as the member unsubscribing from email or deleting her account.

Figure 6:
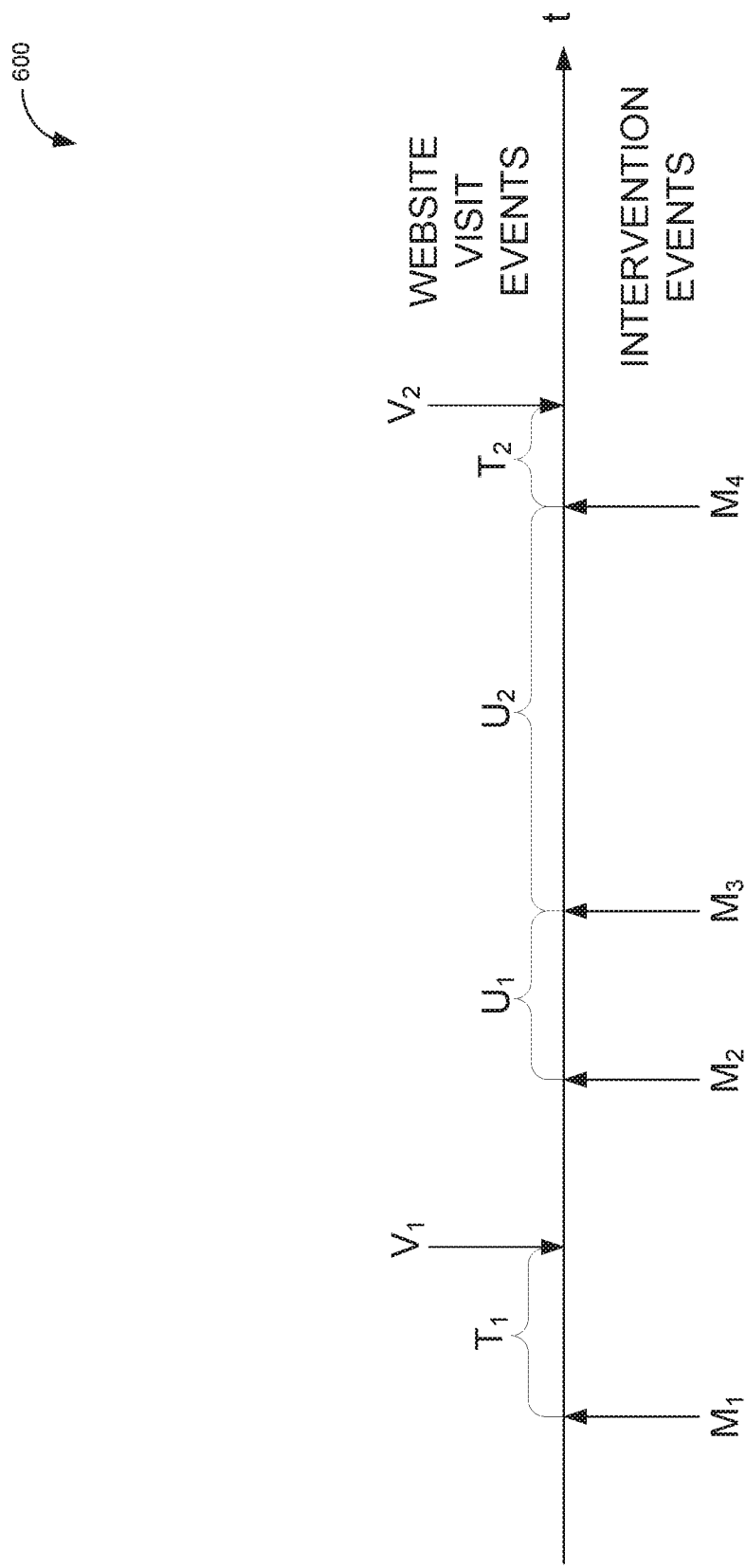
FIG. 6 illustrates, by way of example, a timing diagram of an embodiment of intervention events and website visit events.

FIG. 6 illustrates, by way of example, a timing diagram 600 of an embodiment of intervention events and website visit events. A challenge with one or more embodiments is accurately determining a time between an intervention (M) and a website visit (V). In the embodiment of FIG. 6, a first website visit $V_1$ is observed at time, $T_1$, after intervention $M_1$. However, not all scenarios are this simple. Consider the first website visit, $V_2$, observed after three interventions, $M_2$, $M_3$, and $M_4$. It is not clear which of the interventions $M_2$, $M_3$, and $M_4$, if any, caused the user to visit the website at visit, $V_2$.

The visit, $V_2$, is observed in a time, $T_2$, after the intervention, $M_4$. However, there was no website visit observed directly after $M_2$ or directly after $M_3$. The interventions $M_2$ and $M_3$ are said to be "right-censored". Censored intervention events can be treated differently than un-censored interventions (e.g., interventions which are immediately followed by a website visit before another intervention is observed). Uncensored interventions of FIG. 6 include $M_1$ and $M_4$, which are followed by website visits $V_1$ and $V_2$, respectively, without another intervention event between the intervention and the visit. Censored events in the embodiment of FIG. 6 include the interventions $M_2$ and $M_3$. These interventions are followed immediately by a further intervention without a website visit between the intervention and the next intervention. A time between consecutive intervention events is labelled as $U_1$ and $U_2$, respectively.

If only the times $T_1$ and $T_2$ are used for training, a biased expectation time to website visit is realized. The biased expectation time can tend to be less than the actual time to website visit. To help alleviate this problem, both the censored times, $U_1$ and $U_2$, and the uncensored times, $T_1$ and $T_2$ can be recorded and used for training. A censor bit can indicate whether the time corresponds to a censored or un-censored time. An example of data that can be used for training is provided in Table 1.

| OBSERVATION | TIME TO EVENT | CENSORED BIT |
|---|---|---|
| 1 | $T_1$ | 0 |
| 2 | $U_1$ | 1 |
| 3 | $U_2$ | 1 |
| 4 | $T_2$ | 0 |

A survival analysis can be performed to train with censored data. Both censored and uncensored time frames can be used in a model using a likelihood analysis, such as in Eq. 5.

$$L(\theta) \propto \begin{cases} Pr(T = t \mid \theta) & \text{if un-censored} \\ Pr(T > u \mid \theta) & \text{if censored} \end{cases} \qquad \text{Eq. 5}$$

It is difficult to separate a user's spontaneous (e.g., organic) website visits from a website visit that is triggered by an intervention. Embodiments provide a solution that does not require such separation. Embodiments accomplish this by determining a difference between a first probability that the user visits the website with intervention and a second probability that the user visits the website without intervention. Assuming that the amount of effect organic website visits has on both the first and second probabilities are equal, the organic website visits have no effect on the difference between the first and second probabilities.

A Weibull distribution provides flexibility in modelling and analysis of time-to-event data. The Weibull distribution is currently the only parametric regression model which has both a propensity hazards representation and an accelerated failure-time representation. The probability density function of a Weibull distribution is:

$$f(x; \lambda; \alpha) = \begin{cases} \alpha \lambda x^{\alpha-1} e^{-\lambda x^\alpha} & x \geq 0, \\ 0 & x < 0 \end{cases}$$

An exponential distribution is a special case of the Weibull distribution where $\alpha=1$. A survival function of the Weibull distribution is provided in Eq. 6.

$$S(x;\lambda;\alpha) = Pr(T>x) = e^{-\lambda x^\alpha} \, x \geq 0 \qquad \text{Eq. 6}$$

A hazard function for the Weibull distribution is provided in Eq. 7.

$$h(x; \lambda; \alpha) = \frac{f(x; \lambda; \alpha)}{S(x; \lambda; \alpha)} = \alpha \lambda x^{\alpha-1} \qquad \text{Eq. 7}$$

An accelerated failure time model is now described. For a random time-to-event T, an accelerated failure time model assumes a relationship between covariates Z and T. Consider the following linear model $$\log T_i = b z_i + \sigma W_i$$

Where Wi is the error and follows a given distribution. Such models are sometimes called "log-linear" models. Depending on the distribution specified for Wi, a different model will be obtained. If Wi follows an extreme value distribution with probability density function $f_w(w) = e^{(w - e^w)}$, then Ti follows a Weibull distribution with $\lambda_i = e^{-\mu_i/\sigma}$ and $\alpha = 1/\sigma$, where $\mu_i = b z_i$.

Parameters in accelerated failure time models can be estimated by maximizing a log likelihood of observed training data. Namely, $\hat{b}$ and $\hat{\sigma}$. For each user $\hat{\mu}_i = \hat{b} z_i$, and $\hat{\lambda}_i = e^{-\hat{\mu}_i/\hat{\sigma}}$. The probability of a user visiting the site within the next w time given an intervention is then given by Eq. 8.

$$Pr(T_i \leq w \mid z_i, m) = 1 - e^{-\hat{\lambda}_i w^{\hat{\alpha}}} \qquad \text{Eq. 8}$$

A prediction of the probability of a user i visiting the site within the next w time without a notification is described in Equation 9. If no notification is sent, the user is still in the previous state (e.g. previous badge count). To calculate this probability the previous state can be used. The time to visit for the previous state is $T_{i,-1}$, which follows Weibull distribution with $\hat{\lambda}_{i,-1}$ and $\hat{\alpha}$. The time since the start of last state is, since it is known that $T_{i,-1} > t_{-1}$, which means the user did not visit in the past $t_{-1}$. The user i visiting the site within the next w time without a notification means $T_{i,-1} \leq w + t_{-1}$ given that $T_{i,-1} > t_{-1}$. So the probability can be calculated using Equation 9 as below, $$P(T_i \leq w \mid z_i, \neg m) = P(T_{i,-1} \leq w + t_{-1} \mid z_i, m_{-1}, T_{i,-1} > t_{-1}) = \qquad \text{Eq. 9}$$
$$\frac{P(t_{-1} < T_{i,-1} \leq w + t_{-1} \mid z_i, m_{-1})}{P(T_{i,-1} \geq t_{-1} \mid z_i, m_{-1})} =$$
$$1 - \exp\left(-\hat{\lambda}_{i,-1}(w + t_{-1})^{\hat{\alpha}} + \hat{\lambda}_{i,-1}(t_{-1})^{\hat{\alpha}}\right)$$

One specific type of intervention is providing a user with a notification of people they may know, see FIGS. 1 and 2 for example. The pVisit model discussed (e.g., the accelerated failure time constrained by a Weibull distribution) can be used for predicting whether a website visit will occur given a notification of people you may know.

Figure 7:
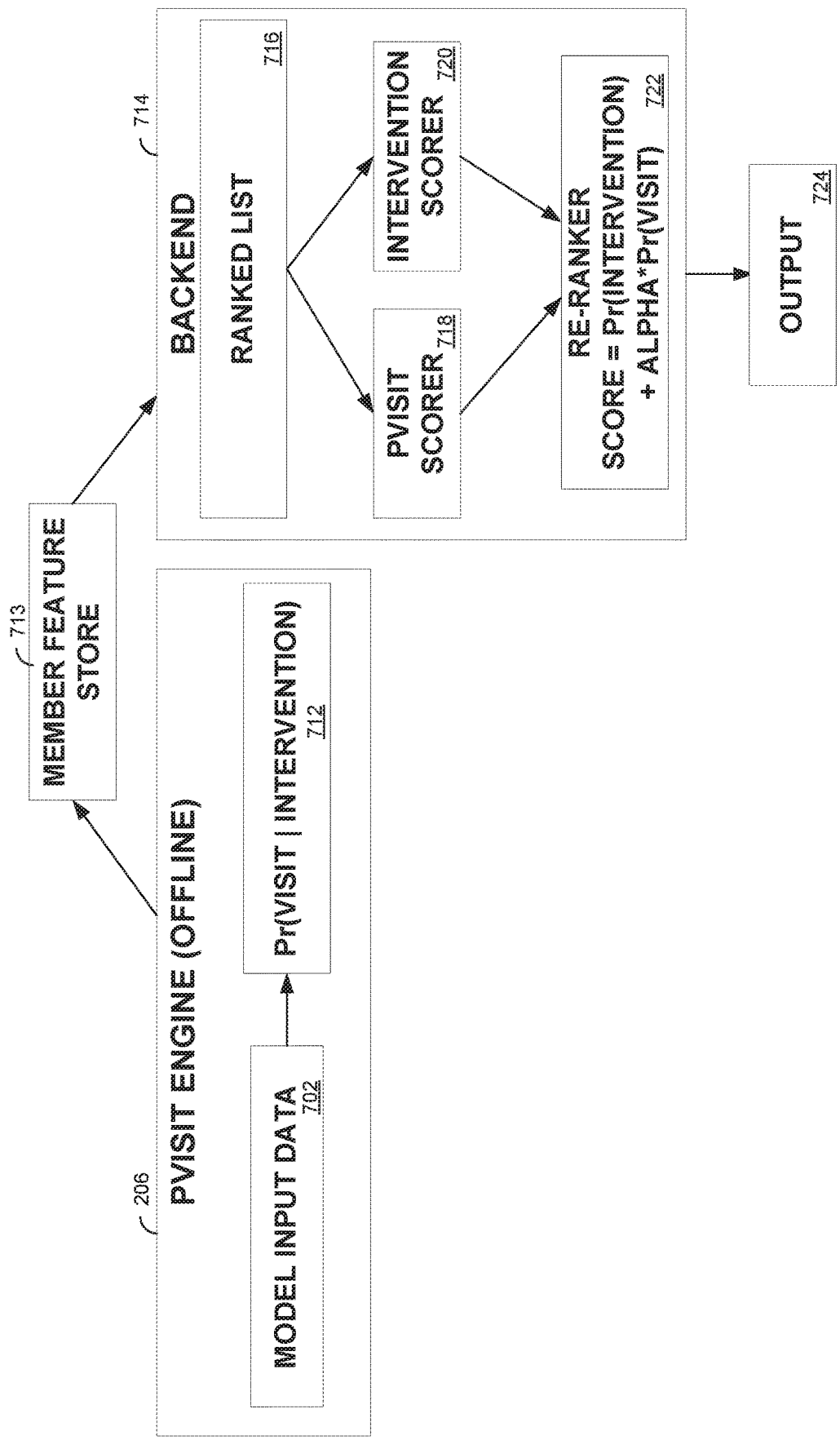
FIG. 7 illustrates, by way of example, a diagram of an embodiment of a system for pVisit modelling.

FIG. 7 illustrates, by way of example, a diagram of an embodiment of a system 700 for pVisit modelling in accord with some embodiments. The system 700 as illustrated includes the pVisit engine 206, a member feature store 713, and backend circuitry 714. The pVisit engine 206 is discussed previously. The pVisit engine 206 can receive or retrieve data including model input data 702. The model input data 702 can include count of notifications received, whether a member has an app installed or push notifications enabled, notification email click through rate (CTR), last visit date, or the like.

Historical session count can indicate a number of website visits per unit time. For example, historical session counts can indicate one website visit per week, per month, per day, less than a month, or the like. In one or more embodiments, the pVisit engine 206 can filter out users that are more active, such as users that visit the website more than a specified number of times per month (e.g., one, two, three, or more times a month).

The count of notifications received indicates a number of interventions received by the member per unit time. For example, the count of notifications can indicate x notifications per day, week, month, year, or a time therebetween.

The member app installation and push notification enabled can be a binary value that indicates whether the member has both an app installed and push notifications enabled (e.g., "1") or whether either the app is not install or push notifications are not enabled (e.g., "0"). The notification email CTR indicates the percentage of emails getting clicked through out of all emails viewed by a user.

The last visit date indicates a date and/or time that the member last visited the website. For example, the last visit date can indicate a date, month, and/or year the user last visited the website. In another example, the last visit date can indicate whether the user last visited the website in a specified amount of time (e.g., day, week, month, year), such as with a "1" or the member has not visited the website in the specified amount of time, such as with a "0".

The pVisit engine 206 can consider these data in determining Pr(visit intervention) 712. The Pr(visit intervention) can be determined using an accelerated failure time mode, such as previously discussed. The accelerated failure time model can be trained using the data, such as the model input data 702. The Pr(visit intervention) 712 can be determined offline and provided to a member feature store 713. The member feature store 713 can be accessible by the application server(s) 118 (see FIG. 2), such as during a user's live session on the website, or at a specified time. The member feature store 713 can be part of the database(s) 126 (see FIG. 3) or the data layer 205. The member feature store 713 can include ranked lists of content (e.g., interventions). The ranked lists can include content based on their determined relevance to the member. For example, a ranked list of a specified number of other members a member may know can include members the user knows ranked by highest to lowest probability of likelihood of knowing. In another example, the ranked list includes notifications ranked on relevance to the member.

The Pr(visit intervention) 712 can be accessible by the backend circuitry 714. The backend circuitry 714 can include processing circuitry to perform multi-objective optimization, such as can be based on Pr(visit intervention) 712. The backend circuitry 714 can generally use a solution to a single constraint optimization problem (e.g., Pr(visit intervention) 712) and provide a solution that is based on multiple constraints, such as by performing multi-objective optimization previously discussed.

The backend circuitry 714 can retrieve a ranked list from the member feature store 713. The backend circuitry 714 can re-rank the retrieved ranked list. The re-ranking can be performed based on the Pr(visit intervention) 712. The Pr(visit intervention) 712 can be broken into a pVisit score, by a pVisit scorer 718, and an intervention score, by an intervention scorer 720. The pVisit scorer 718 determines a likelihood of a user visit. The intervention scorer 720 that determines a quality of a intervention for a given member. The ranker 722 determines a value (e.g., score) based on Pr(intervention)+alpha*Pr(visit). An output 724 can includes re-ranked list of one or more interventions. The items of the re-ranked list can be in a same or different order than the initially ranked list.

Figure 8:
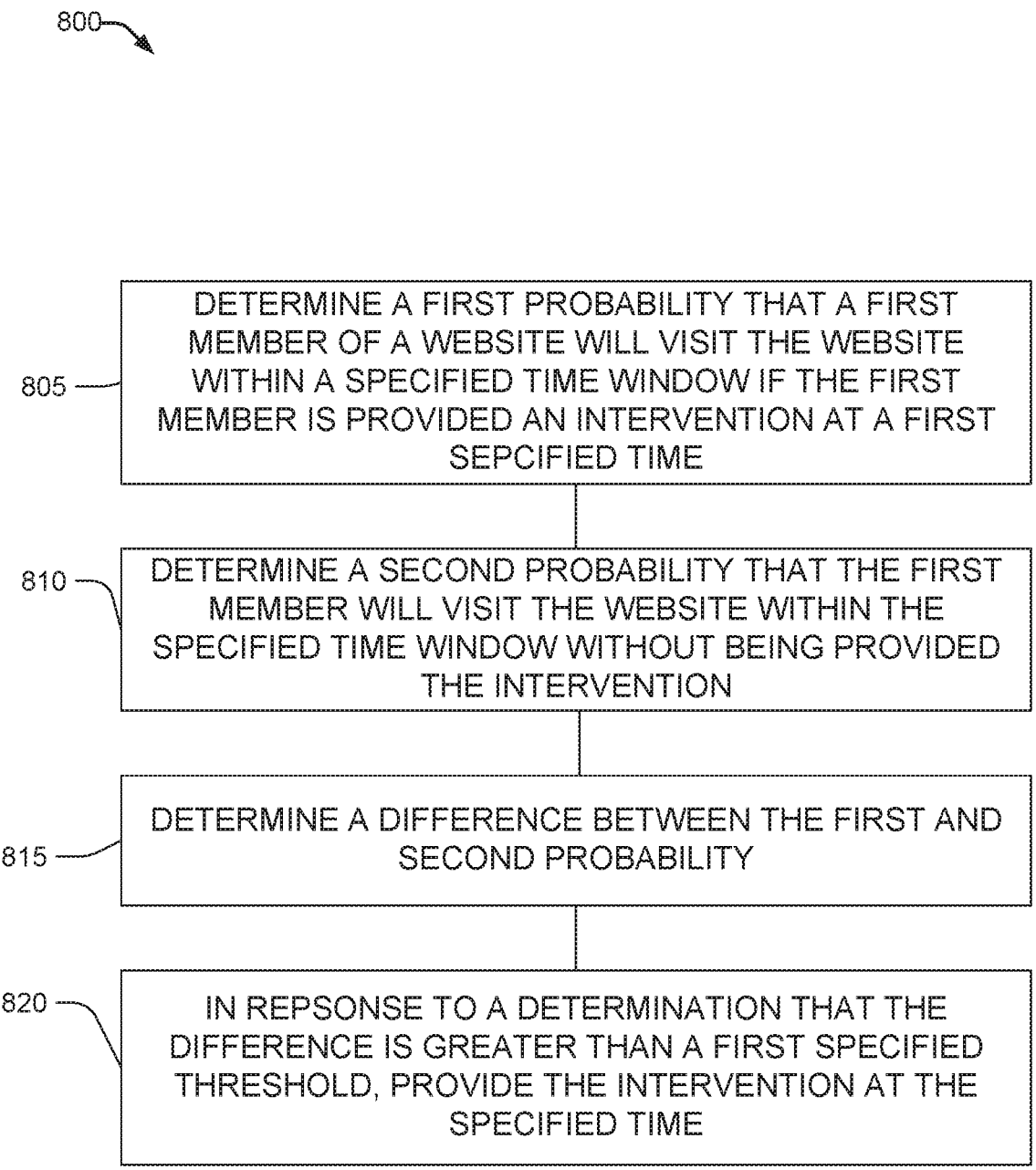
FIG. 8 illustrates, by way of example, a flowchart of an embodiment of method.

FIG. 8 illustrates, by way of example, a flowchart of an embodiment of method 800. The method 800 as illustrated includes determining a first probability that a first member of members of a website will visit the website within a specified time window if the first member is provided an intervention at a specified time, at operation 805; determining a second probability that the first member will visit the website within the specified time window without being provided the intervention, at operation 810; determining a difference between the first and second probability, at operation 815; and in response to determining the difference is greater than a first specified threshold, providing the intervention at the specified time, at operation 820.

The method 800 can further include identifying whether the first member visits the website at a rate less than a second specified threshold. The method 800 can further include, wherein the determining the first probability, the second probability, and the difference only occur in response to identifying that the first member visits the website at the rate less than the specified threshold. The method 800 can further include, wherein the second specified threshold is one or two times per month. The operation 802 can further include determining the first probability includes using an accelerated failure time model constrained by a Weibull distribution.

The method 800 can further include training the accelerated failure time model based on historical session counts of the member, a count of interventions received in a specified time period, and a last date the member visited the website. The method 800 can further include, wherein the accelerated failure time model is further trained based on whether the member includes an app installed on a mobile device and push notifications are enabled for the app.

The method 800 can further include, wherein the first probability is determined offline and updated based on updated historical session counts of the member, updated count of interventions received in a specified time period, and updated last date the member visited the website. The method 800 can further include, wherein training the accelerated time failure model further includes training based on censored and uncensored intervention events, wherein a censored intervention event is followed in time by another intervention event before a website visit and an uncensored intervention event is followed in time by a website visit before another intervention event.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module mechanically, in dedicated and permanently configured circuitry, or in temporarily configured circuitry (e.g., configured by software) may be driven by cost and time considerations.

The term "hardware module" is a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. Another hardware module may, at a later time, access the memory device to retrieve and process the stored output. Hardware modules may initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces application program interfaces (APIs)).

Example embodiments may be implemented in digital electronic circuitry, or in computer hardware, firmware, software, or in combinations of them. Example embodiments may be implemented using a computer program product (e.g., a computer program tangibly embodied in an information carrier, such as in a machine-readable medium for execution by, or to control the operation of, data processing apparatus, such as a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server is generally remote from each other and typically interact through a communication network. The relationship of client and server arises through computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
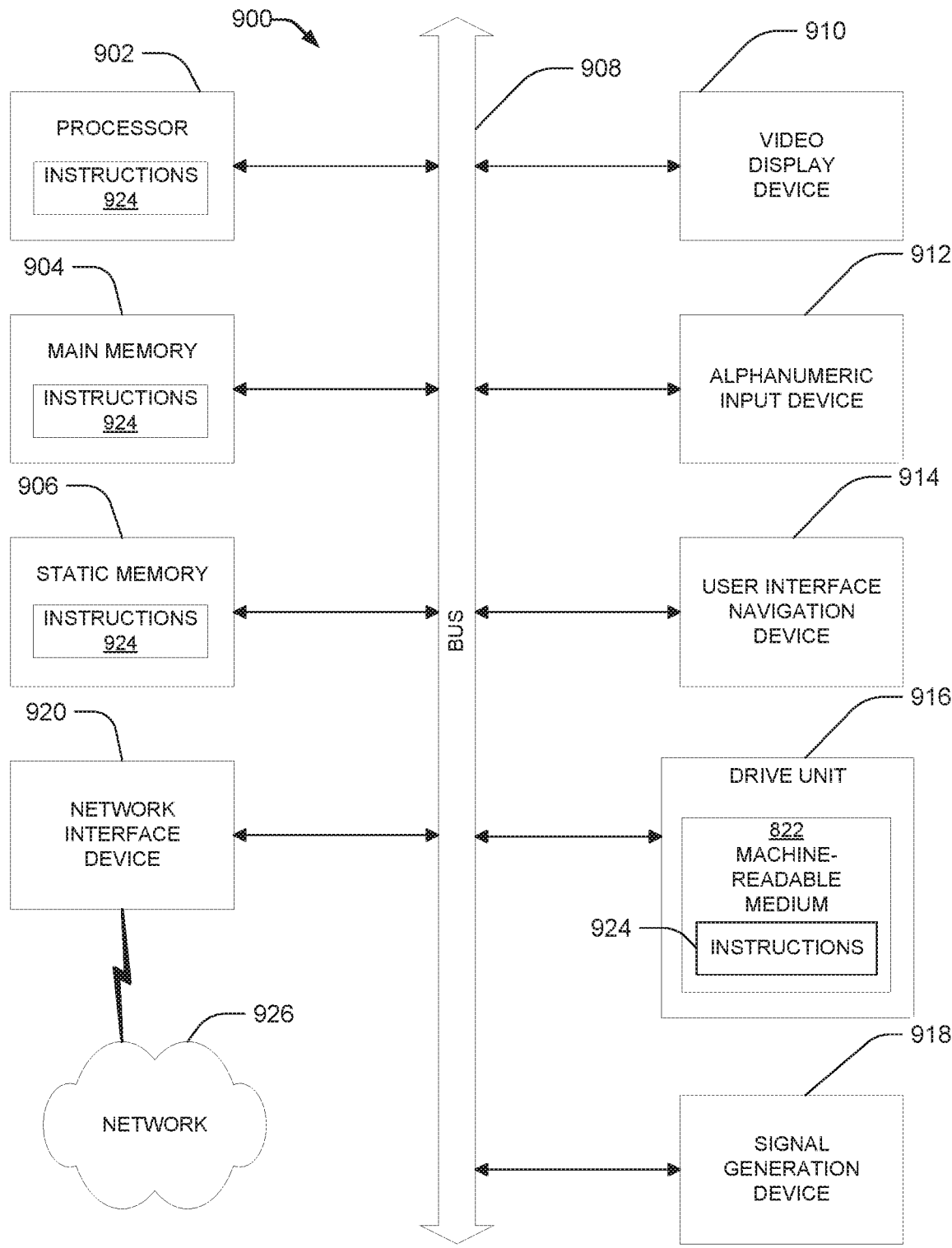
FIG. 9 illustrates, by way of example, a block diagram of an embodiment of a computer system on which operations, actions, or methodologies may be executed.

FIG. 9 illustrates, by way of example, a block diagram of an embodiment of a computer system on which operations, actions, or methodologies may be executed. One or more components of the pVisit engine 206, front end 201, or application logic layer 203, the system 300, or the like, may include one or more components of the computer system 900. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 900 includes a processor 902 (e.g., a central processing unit (CPU), a graphics processing unit (GPU) or both), a main memory 904, and a static memory 906, which communicate with each other via a bus 908. Computer system 900 may further include a video display device 910 (e.g., a liquid crystal display (LCD) or a cathode ray tube (CRT)). Computer system 900 also includes an alphanumeric input device 912 (e.g., a keyboard), a user interface (UI) navigation device 914 (e.g., a mouse or touch sensitive display), a disk drive unit 916, a signal generation device 918 (e.g., a speaker) and a network interface device 920.

Disk drive unit 916 includes a machine-readable medium 922 on which is stored one or more sets of instructions and data structures (e.g., software) 924 embodying or utilized by any one or more of the methodologies or functions described herein. Instructions 924 may also reside, completely or at least partially, within main memory 904, within static memory 906, and/or within processor 902 during execution thereof by computer system 900, main memory 904 and processor 902 also constituting machine-readable media.

While machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" includes any tangible medium that may store, encode, or carry instructions for execution by the machine and that cause the machine to perform any one or more of the methodologies of the present technology, or that may store, encode, or carry data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., erasable programmable read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 924 may further be transmitted or received over a communications network 926 using a transmission medium. Instructions 924 may be transmitted using network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that may store, encode, or carry instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system, comprising:
   a processor;
   a memory device holding an instruction set executable on the processor to cause the computer system to perform operations comprising:
   identifying a first user of users of a website visits the website at a rate less than a second specified threshold;
   only in response to identifying that the first user visits the website at the rate less than the second specified threshold:
   determining a first probability that the first user will visit the website within a specified time window if the first user is provided an intervention at a specified time;
   determining a second probability that the first user will visit the website within the specified time window without being provided the intervention; and
   determining a difference between the first and second probability; and
   in response to determining the difference is greater than a first specified threshold, providing the intervention at the specified time.

2. The computer system of claim 1, wherein the second specified threshold is one or two times per month.

3. The computer system of claim 1, wherein determining the first probability includes using an accelerated failure time model constrained by a Weibull distribution.

4. The computer system of claim 3, further comprising training the accelerated failure time model based on historical session counts of the user, a count of interventions received in a specified time period, and a last date the user visited the website.

5. The computer system of claim 4, wherein the accelerated failure time model is further trained based on whether the user includes an app installed on a mobile device and push notifications are enabled for the app.

6. The computer system of claim 4, wherein the first probability is determined offline and updated based on updated historical session counts of the user, updated count of interventions received in a specified time period, and updated last date the user visited the website.

7. The computer system of claim 4, wherein training the accelerated failure time model further includes training based on censored and uncensored intervention events, wherein a censored intervention event is followed in time by another intervention event before a website visit and an uncensored intervention event is followed in time by a website visit before another intervention event.

8. A method comprising:
identifying a first user of users of a website visits the website at a rate less than a second specified threshold;
only in response to identifying that the first user visits the website at the rate less than the second specified threshold:
determining a first probability that the first user will visit the website within a specified time window if the first user is provided an intervention at a specified time;
determining a second probability that the first user will visit the website within the specified time window without being provided the intervention; and
determining a difference between the first and second probability; and
in response to determining the difference is greater than a first specified threshold, providing the intervention at the specified time.

9. The method of claim 8, wherein the second specified threshold is one or two times per month.

10. The method of claim 8, wherein determining the first probability includes using an accelerated failure time model constrained by a Weibull distribution.

11. The method of claim 10, further comprising training the accelerated failure time model based on historical session counts of the user, a count of interventions received in a specified time period, and a last date the user visited the website.

12. The method of claim 11, wherein the accelerated failure time model is further trained based on whether the user includes an app installed on a mobile device and push notifications are enabled for the app.

13. The method of claim 11, wherein the first probability is determined offline and updated based on updated historical session counts of the user, updated count of interventions received in a specified time period, and updated last date the user visited the website.

14. The method of claim 11, wherein training the accelerated failure time model further includes training based on censored and uncensored intervention events, wherein a censored intervention event is followed in time by another intervention event before a website visit and an uncensored intervention event is followed in time by a website visit before another intervention event.

15. A non-transitory machine-readable storage medium embodying instructions that, when executed by one or more processors, cause the one or more processors to perform operations comprising:
identifying a first user of users of a website visits the website at a rate less than a second specified threshold;
only in response to identifying that the first user visits the website at the rate less than the second specified threshold:
determining a first probability that the first user will visit the website within a specified time window if the first user is provided an intervention at a specified time;
determining a second probability that the first user will visit the website within the specified time window without being provided the intervention;
determining a difference between the first and second probability; and
in response to determining the difference is greater than a first specified threshold, providing the intervention at the specified time.

16. The non-transitory machine-readable storage medium of claim 15, wherein the second specified threshold is one or two times per month.

17. The non-transitory machine-readable storage medium of claim 15, wherein determining the first probability includes using an accelerated failure time model constrained by a Weibull distribution.

* * * * *